Patented Apr. 21, 1925.

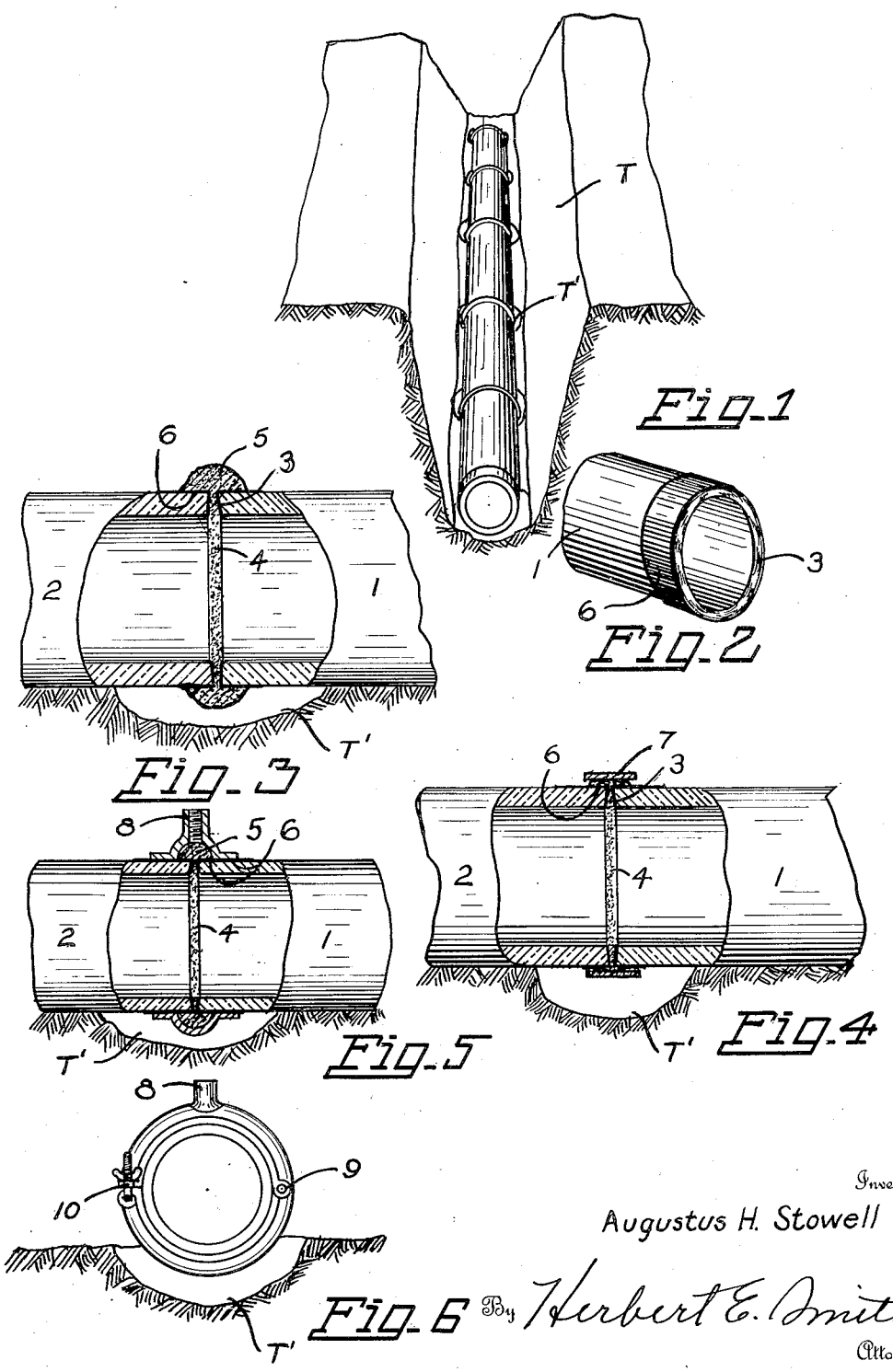

1,534,425

UNITED STATES PATENT OFFICE.

AUGUSTUS H. STOWELL, OF SPOKANE, WASHINGTON.

PIPE JOINT.

Application filed April 7, 1923. Serial No. 630,537.

*To all whom it may concern:*

Be it known that I, AUGUSTUS H. STOWELL, a citizen of the United States, residing at Spokane, in Spokane County, and State of Washington, have invented certain new and useful Improvements in Pipe Joints, of which the following is a specification.

My present invention relates to improvements in pipe joints for use in the construction of sewers, irrigation pipe lines, etc., wherein the abutting ends of the pipe sections are cemented tightly together, and the joints made in such manner as to avoid cracking or breaking, due to unequal expansion of contraction of the pipe sections and the joint material. Because of the inequality of expansion and contraction between pipe sections made of vitrified tile and the cementitious material used at the joint in such pipe lines, when these parts are subjected to changes in temperature for instance, or from other causes, if proper means are not provided to compensate for this inequality, the joint is likely to crack or break.

Therefore the primary object of my invention is to provide means at the joint, in the form of a plastic, semi-plastic, or sticky material forming an exterior band or coating near or at the abutting ends of the pipe sections, to which the cementitious material of the joint adheres, and in which said joint material becomes set in such manner as to compensate for the above referred to changes, and yet maintain a secure and tight joint. The invention consists in certain novel features of construction and combinations and arrangements of parts as will be hereinafter more fully set forth and claimed.

In the accompanying drawings I have illustrated the physical embodiment of my invention in which the parts are combined and arranged in accordance with the principles thereof, and have shown several means that may be employed for making the joints.

Figure 1 is a perspective view showing a ditch or trench, and a pipe line therein with joints connected according to my invention.

Figure 2 is a view in perspective showing one end of a pipe section, having a coating or ring thereon for use in making the joint.

Figure 3 is a view partly broken away to show in section a completed joint.

Figure 4 is a view similar to Figure 3 showing a permanent metal band with gasket filling, in place.

Figure 5 is a similar view showing a mold ring with a pouring nipple for the introduction of the cement to make the joint.

Figure 6 is a view at the end of a pipe section with the mold ring in place for use.

The trench or ditch indicated as T may be used in the construction of sewers, irrigation pipe lines, or for other purposes, and preferably transverse groove T' are made in the bottom of the trench by undercutting, to permit access of the workmen in making joints.

Two of the pipe sections are indicated as 1 and 2 and it will be understood that these sections may be of various dimensions, but are usually made of vitrified clay in customary manner. It is also understood that the material of said joint may be of cement or of pliable material poured when in liquid form or used in the form of a gasket.

Both ends of each of the pipe sections employed in a pipe line are dished as at 3, that is, the end walls are partially beveled in order that when the adjoining ends are brought to position to make a joint, the space between these ends is formed with a minimum exterior width and a maximum interior width. This formation of the pipe ends provides a wedge shape key or ring 4 when the cement is poured or otherwise introduced to the joint. The wedge shaped ring thus formed locks the two ends of the pipe sections together to prevent relative movement of the sections.

At the exterior of the joint a retaining band 5 is formed of cement, which band extends laterally and over the adjoining, exterior faces of the pipes, and of course is integral with the joint ring between the pipe ends.

On the exterior face of each of the pipe sections, and at both ends of each section I apply a coating or ring 6, which may be of a plastic, semi-plastic, or other sticky material, such as asphaltum, gum, paste or other suitable material. This sticky material is designed to receive the material of the retaining band 5 and ring 4 as it is applied to the joint, and the material of the band and ring adheres closely thereto and is set therein as the cement sets.

The cement may be applied and the joint may be made by the use of a hand tool as a trowel, and proper precautions are employed to insure a smooth and flush surface within the pipe line at the junction of the ring 4 with the pipe sections.

A mold ring 7, as illustrated in Figure 5, of metal or other material, may be employed to form the joint and economize in the use of the cement. The joint material or cement may be introduced to the interior of the mold ring through a pouring nipple 8 at the top of the pipe joint, and the material flowed around the joint from the top, as it is introduced through the nipple. The mold ring is of course removable, and preferably is made in sections, hinged at 9 and provided with a detachable fastening 10 diametrically opposite the hinge joint of the ring.

As shown in Figure 3 the cement may be applied by trowel around the joint, and in some instances reinforcing wires may be employed in the joint, after which dirt or soil is filled into the transverse cut T' to complete the joint.

In Figure 5 the cement may be introduced through a cement gun to the joint, and the cement or joint material may have as a base an asphaltum medium to insure a joint that will compensate for inequality of contraction of the joint material and pipe sections.

While I have referred to pipe sections of vitrified clay or tile, it will also be understood that concrete pipe sections may also be joined in this manner. I have found by actual experience that joints made according to my invention, wherein the sticky or plastic material is used for the reception of the cement and to form the connecting medium between the cement and pipe section, and wherein the ends of the adjoining sections are beveled as described, a durable, leak-proof pipe line is insured. When the cement band sets its material is incorporated in the plastic coating 6, and when the cement and pipe materials are subjected to changes in temperature from any cause, the expansion or contraction is compensated for and cracking or breaking is avoided.

Having thus fully described my invention, what I claim as new and desire to secure by Letters Patent is:—

A joint comprising spaced pipe sections each having a smooth exterior face and a coating of asphaltum thereon, the adjoining ends of said pipes having beveled faces to form an opening wedge shaped in cross section, a filling of cement in said opening, and an exterior band of cement integral with said filling embedded in the asphaltum coatings.

In testimony whereof I affix my signature.

AUGUSTUS H. STOWELL.